United States Patent [19]

Pessel

[11] 4,157,988
[45] Jun. 12, 1979

[54] METHOD AND COMPOSITION FOR REMOVING SULFUR DIOXIDE FROM FLUE GASES

[75] Inventor: Leopold Pessel, Wyndmoor, Pa.

[73] Assignee: American Electronic Laboratories, Inc., Colmar, Pa.

[21] Appl. No.: 816,293

[22] Filed: Jul. 18, 1977

Related U.S. Application Data

[60] Division of Ser. No. 678,291, Apr. 19, 1976, Pat. No. 4,091,075, which is a continuation-in-part of Ser. No. 545,928, Jan. 31, 1975, Pat. No. 4,070,441.

[51] Int. Cl.$^2$ ..................... B01J 27/02; C01B 17/00
[52] U.S. Cl. ................................. 252/440; 423/242; 423/244; 252/191
[58] Field of Search ............... 423/242, 244; 252/440, 252/191

[56] References Cited

U.S. PATENT DOCUMENTS

| 2,021,939 | 11/1935 | Johnstone | 55/134 X |
|---|---|---|---|
| 2,115,874 | 5/1938 | Rehm | 252/440 X |
| 2,173,877 | 9/1939 | Clark et al. | 423/243 X |
| 2,188,324 | 1/1940 | Walthall | 252/440 X |
| 3,238,272 | 3/1966 | Nixon | 252/440 X |
| 3,836,630 | 9/1974 | Noguchi et al. | 423/242 |

FOREIGN PATENT DOCUMENTS

| 46-23042 | 1971 | Japan | 252/440 |
|---|---|---|---|
| 396969 | 8/1933 | United Kingdom | 423/242 |

Primary Examiner—Delbert E. Gantz
Assistant Examiner—William G. Wright
Attorney, Agent, or Firm—Jacob Trachtman

[57] ABSTRACT

In a "first" scrubbing operation, the sulfur dioxide containing flue gas is scrubbed with an aqueous solution containing ferric sulfate and aluminum sulfate. The ferric sulfate oxidizes the sulfur dioxide to sulfuric acid, which dissolves in the solution, and is reduced to ferrous sulfate. In a subsequent "second" scrubbing operation, the solution, now containing ferrous sulfate, aluminum sulfate, and sulfuric acid, is scrubbed with air. This regenerates, or re-oxidizes the ferrous sulfate to ferric sulfate. The presence of aluminum sulfate accelerates the rate of regeneration. The regenerated solution is then returned to its function in a "first" scrubbing operation, and the indicated cycle of "first" and "second" scrubbing operations are repeated.

7 Claims, 1 Drawing Figure

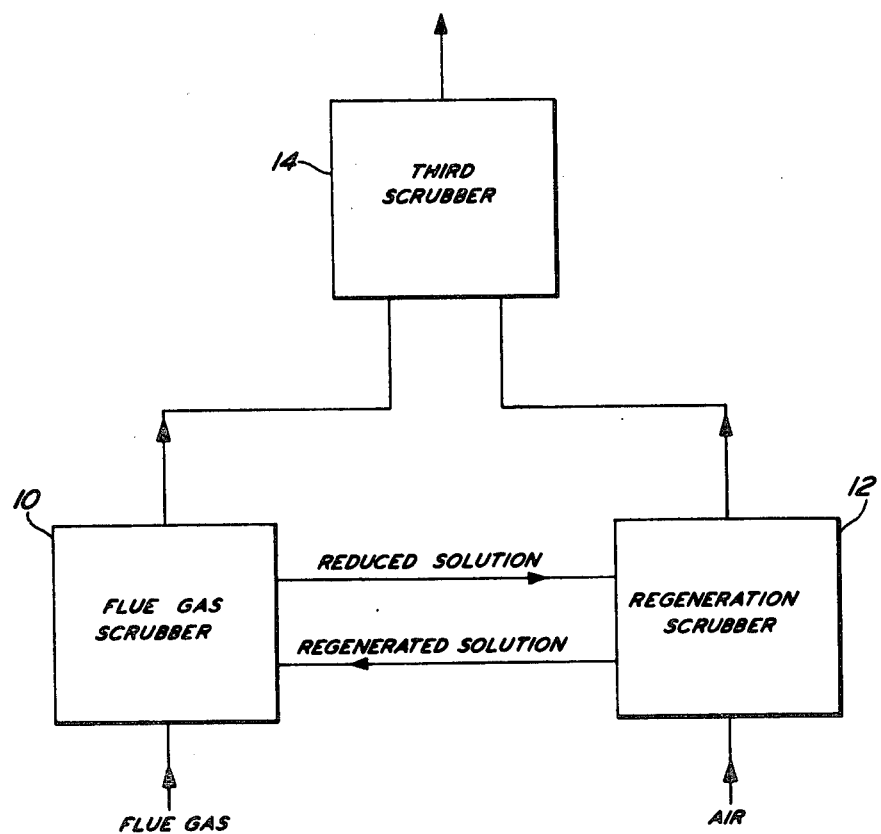

METHOD AND COMPOSITION FOR REMOVING SULFUR DIOXIDE FROM FLUE GASES

This is a division of my application Ser. No. 678,291 filed Apr. 19, 1976 now U.S. Pat. No. 4,091,075, which is a continuation-in-part of my application Ser. No. 545,928 filed on Jan. 31, 1975 now U.S. Pat. No. 4,070,441.

The present invention relates to a method and composition for removing sulfur dioxide from flue gases, and particularly to a method which is economical in that the ingredients are regenerated and recycled for long usage life, and when exhausted are in a form which has other commercial usage.

The invention disclosed herein pertains to certain improvements in a process described in my U.S. application for patent Ser. No. 545,928 now U.S. Pat. No. 4,070,441, issued Jan. 24, 1978 and entitled "Method of Removing Sulfur Dioxide From Flue Gases." The improvements pertain, first, to compositions novel in fluids used for scrubbing flue gases, which compositions greatly accelerate the rate of "regeneration" in the air-scrubbing stage which is part of this process. Additional corollary improvements pertain to means of improving the efficiency of the process, and to means of enhancing its economic attractiveness.

Therefore, it is an object of the present invention to provide a novel method and composition for removing sulfur dioxide from flue gases.

It is another object of the present invention to provide a method and composition for removing sulfur dioxide from flue gases in which the materials used can be regenerated and recycled for economic operation.

It is still another object of the present invention to provide a method and composition for removing sulfur dioxide from flue gases in which the materials used can be regenerated and recycled, but when completely exhausted are in a form which has commercial utility.

Other objects will appear hereinafter.

These objects are achieved by a method and composition wherein the sulfur dioxide containing flue gases are scrubbed with an aqueous solution of ferric sulfate which oxidizes the sulfur dioxide to sulfuric acid which dissolves in the solution. The ferric sulfate is reduced to ferrous sulfate. The solution is then scrubbed with air to reoxidize the ferrous sulfate to ferric sulfate and thereby regenerate the solution for use in removing additional sulfur dioxide from the flue gas. An improvement is the addition of aluminum sulfate to the solution which accelerates the rate of regeneration.

For the purpose of illustrating the invention there is shown in the drawing a form which is presently preferred; it being understood, however, that this invention is not limited to the precise arrangements and instrumentalities shown.

The FIGURE of the drawing is a flow chart of the method of the present invention.

As shown in the drawing, the sulfur dioxide containing flue gas is passed into a flue gas scrubber 10 in Stage I which contains an aqueous solution of ferric sulfate and, in the disclosed improvement also aluminum sulfate. Subsequently, the reduced solution from the scrubber 10 is passed to a regeneration scrubber 12 in Stage II. The regenerated solution is returned from the scrubber 12 to the flue gas scrubber 10.

In the process described herein, the flue gases are scrubbed with an aqueous fluid containing a substantial amount of a ferric salt, such as ferric sulfate. The sulfur dioxide reacts with the ferric salt, forming sulfur trioxide which is absorbed by the fluid as sulfuric acid. Simultaneously, the ferric salt is reduced to ferrous salt. This stage of the process is subsequently referred to as "Stage I".

In a subsequent "regenerating" stage, the fluid is scrubbed with air. This re-oxidizes the ferrous salt to ferric salt. This stage of the process is subsequently referred to as "Stage II".

By subjecting the fluid alternatingly to Stage I and Stage II, the method is capable of converting all of the sulfur dioxide in the flue gas to sulfuric acid which progressively increases in concentration in the fluid. It should be noted that Stage I and Stage II simply refer to whether the scrubbing is done with flue gas or with air, respectively. This can be accomplished by shifting either the scrubbing fluid or the gas streams into or out of some specific scrubbing equipment. Many types of scrubbing equipment are being manufactured and the specific type to be used in this process is not part of this invention.

In Stage I, the governing chemical reaction is

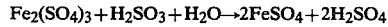

$$Fe_2(SO_4)_3 + H_2SO_3 + H_2O \rightarrow 2FeSO_4 + 2H_2SO_4$$

It should be noted that this reaction proceeds without the presence of gaseous oxygen and without the initial presence of sulfuric acid. It is true that flue gas may also contain air and that sulfuric acid is formed in accordance with the above shown formula. But under conditions where the treated flue gas would be free of air or oxygen, and where the formed sulfuric acid would be instantly removed or neutralized, the reaction in accordance with Stage I would still take place. No catalyst to speed up this reaction is needed or used.

This is an important distinction between this process and three subject-related U.S. Pat. Nos. 2,021,936, 2,342,704 and 3,836,630. In these cited references, gaseous oxygen absorbed in a diluted sulfuric acid solution reacts with sulfur dioxide contained in the flue gas with the aid of a catalyst. The catalyst is selected from ferric and manganese ions and is present in very small amounts, normally a fraction of one percent, 0.6% by weight being the highest cited amount.

On the other hand, in the process disclosed herein, the formation of sulfuric acid requires only the presence of sulfur dioxide, water, and a ferric salt. The reaction proceeds with great speed, over a wide range of temperature, and requires no catalyst to speed it up. However, the process does require a sufficient amount of ferric salt to react with all of the sulfur dioxide present.

Consequently, the amount of ferric salt present in the scrubbing fluid will be far greater than the amount needed in the cited "catalyst" patents for providing up to 0.6% by weight of ferric ions. The amount of ferric salt called for in this process will provide preferably above 1% of ferric ions, ranging up to 4% or higher, depending on the amount of sulfur dioxide in the flue gas treated.

In order to react with all of the sulfur dioxide present, there should always be a certain amount of excess of ferric salt present, in Stage I. While normally a certain amount of air may be present in the flue gas to provide a certain degree of regeneration of ferrous to ferric ions even during the normal Stage I operation, this may not always be sufficient. Consequently, an important aspect of this process is the introduction of a separate "Stage II" to assure that ferric ions are always available in the required excess for operation of Stage I.

In Stage II, the ferrous ions are oxidized to ferric ions by scrubbing with air. The reaction proceeds according to the stoichiometric relationship.

$$2FeSO_4 + O + H_2SO_4 \rightarrow Fe_2(SO_4)_3 + H_2O$$

After the completion of Stage II, the scrubbing composition is ready to be returned again to its function in Stage I. The invention also contemplates the utilization of a Stage III which functions as follows.

The flue gases which leave the flue gas scrubber 10 after the sulfur dioxide is removed, and the air leaving the regeneration scrubber 12 may be fed into a third scrubber 14 which contains an aqueous solution of a nitrogen compound of a basic nature, such as urea $CO(NH_2)_2$ or guanidine $NHC(NH_2)_2$. The purpose of the third scrubber 14 is to trap and absorb any acid mist that may be carried by the gas streams from the flue gas scrubber 10 and the regeneration scrubber 12. The reaction of the acid mist with the solution in the third scrubber 14 may form addition products, which can be ultimately utilized commercially for agricultural fertilizing purposes because of their high nitrogen content. Also, depending on the composition of the flue gas, which may vary widely, such additional scrubbing may also trap and possibly decompose some nitrogen containing combustion gas products, such as in the reaction of urea with nitrous acid:

$$CO(NH_2)_2 + 2NHO_2 \rightarrow CO_2 + 3H_2O + N_2$$

Thus, the third scrubbing can provide additional ecological benefits as well as providing additional commercially usable products.

Thus, there is provided by the present invention a method of removing sulfur dioxide from flue gases in which the materials used are regenerated so as to minimize the amount of material required and thereby minimize the overall cost of the operation. Also, the method can be carried out using standard, commercially available equipment. In addition, the method results in the formation as by-products of materials, such as sulfuric acid, and high-nitrogen content fertilizer materials, which can be sold commercially to further reduce the overall cost of the method.

The above described reaction $$2FeSO_4 + O + H_2SO_4 \rightarrow Fe_2(SO_4)_3 + H_2O$$

proceeds at a much slower rate than the reaction governing Stage I, as will be further discussed below.

The shift from Stage I to Stage II is preferably carried out before all of the ferric ions have been reduced to ferrous ions and while there is still an ample supply of the former. This is considered desirable not only from the point of view of maintaining an adequate mass relationship between the sulfur dioxide in the gas and the ferric salt in the fluid. In addition, there has been some evidence that the presence of ferric ions in the fluid during Stage II exerts an accelerating effect of the oxydation of the ferrous ions. Generally speaking, it is anticipated but not restricted in that respect, that the shift from Stage I to Stage II will be carried out when there are still from 20-50% of the iron ions in the ferric state. This consideration is subject to a number of operating factors, such as the composition of the flue gas with respect to self-regeneration and SO content, the efficiency of both gas and air scrubber, number of air scrubbers (it is anticipated that more than one of these may be used), etc.

The shift from Stage II to Stage I may also take place before complete regeneration of ferrous to ferric ions has taken place. This will also depend on operational factors, demand for scrubbing fluid (even if only partly regenerated), etc.

While the regenerating Stage II proceeds very rapidly in relatively neutral ferrous sulfate solutions, it is slowed down considerably when the solutions are acidified. The mechanism of this slowing down has not been completely clarified, but has been discussed in some detail in the following reference works:

Mellor—Comprehensive Treatise on Inorganic and Theoretical Chemistry 1935. Volume 14, Pages 265-268

Gmelin's Handbook of Inorganic Chemistry 1932. Volume 59, Pages 805-815, in the chapter "Transition reactions $Fe \rightleftarrows Fe$..."

The regenerating action can be accelerated by increasing the temperature. However, even greater acceleration is desirable in acidic solutions. This is due to the fact that in the flue gas treatment described, the sulfuric acid content of the scrubbing fluid increases continuously, as it is being shifted repeatedly from Stage I to Stage II, and back again.

Consequently, acceleration by chemical means in Stage II is of great practical importance. The greater this acceleration, the less the need for additional air scrubbers, and the less the frequency (and power expense) in carrying out the shifts between the stages. Among other advantages of "chemical" acceleration is less dependence on and lower cost of thermal acceleration.

I have now discovered that the rate of regeneration of ferrous ions to ferric ions in solutions which also contain considerable amounts of sulfuric acid by air blown through these solutions can be greatly accelerated by the presence of an aluminum salt, such as aluminum sulfate, in these solutions.

In the course of various tests, the approximate relationship between the concentration of sulfuric acid in aqueous ferrous sulfate solutions and their rate of oxidation to ferric sulfate by blowing air through the solutions was established. Using "thermal" acceleration by maintaining the solutions at 80° C. and a total aeration time of 5 hours, the following approximate relationships were established for a solution containing 20% of $FeSO_4$—$7H_2O$:

| Weight % $H_2SO_4$ | Weight % of total iron converted to Ferric ions |
| --- | --- |
| 2 | 66 |
| 10 | 27 |
| 20 | 33 |
| 40 | 60 |
| 50 | 100 |

The slowest rate of oxydation is in the range of 10-20% by weight of $H_2SO_4$ content. Addition of aluminum sulfate accelerates the rate of oxydation in solutions containing various concentrations of sulfuric acid and ferrous sulfate.

As a typical example, the following tabulation shows the rate of acceleration due to varying amount of aluminum sulfate in aqueous solutions containing in weight %, $H_2SO_4$ 20% $FeSO_4$—$7H_2O$ 20%. the solution temperature was 80° C. and the time of aeration was 5 hours.

| Weight % of $Al_2(SO_4)_3$ - $16H_2O$ in the solution | Weight % of total iron converted to Ferric ions |
|---|---|
| 1.12 | 34 |
| 10 | 36 |
| 20 | 40 |
| 30 | 41 |

It is seen, that without the presence of aluminum sulfate, the rate of oxydation in a solution containing 20% by weight of $H_2SO_4$, under the stated conditions, is 33%. By adding 10, 20, and 30 weight percent of $Al_2(SO_4)_3$—$16H_2O$ to the solution, this rate is increased to 36, 40, and 41%, respectively.

The described effect is noticeable already with an addition of 1.12% by weight of the aluminum salt, providing 0.05% by weight of aluminum ions in solution. A small, but noticeable, increase in the rate of oxydation to 34% is observed.

In the above given examples, the percentage of the aluminum salt is such that the composition is not only a liquid at an elevated temperature anticipated for scrubbing (such as 80° C., as an example), but also a liquid when cooled to ambient room temperature.

However, an even greater acceleration of the rate of oxydation of the ferrous salt can be attained if the amount of aluminum salt is increased to such a level that the resulting composition, while a liquid at an anticipated scrubbing temperature of above 70° C., becomes a solid when cooled to ambient room temperature.

As an example, a composition is prepared containing its approximate parts by weight: Water 36, concentrated sulfuric acid 8, $FeSO_4$—$7H_2O$ 16 (providing about 4.57 parts of $Fe_2O_3$ equivalent), and $Al_2(SO_4)_3$—$16H_2O$ 40 (providing about 6.48 parts of $Al_2O_3$ equivalent). The components are mixed and heated until a homogeneous liquid is formed. After 5 hours of air scrubbing at 80° C., about 50% of the nominal total of about 4% iron ions present are oxidized from the ferrous to the ferric state.

The above composition, as an example of many other possible ones with variations in composition which would be rather obvious to a technical person, is a solid at room temperature. It has to be heated to about 70°-75° C. (about 170° F.) to be sufficiently fluid to serve as a scrubbing fluid at about 80° C. (about 180° F.).

Heating the fluid to that temperature level, or even a higher one, to obtain thermal acceleration is, of course, desirable. However, another advantage, and one that is novel and unexpected, is to use a composition such as the above described example, which is a fluid in the temperature range where it is used for scrubbing but becomes a solid when cooled down to ambient temperature. The importance of this feature arises from the fact that for subsequent industrial utilization of the scrubbing fluid, its state of being a solid rather than a liquid at room temperature facilitates handling, transportation and shipment, and thus prevents an economic advantage.

While indications were obtained that aluminum salts other than the sulfate have an accelerating effect similar to that of the sulfate, the use of the latter is a preferred embodiment, of this invention. This preference is a matter of convenience, because the whole system involved is a sulfate system and addition of other anions may, or may not, introduce other complications.

Also, the exact composition of the aluminum sulfate may be subject to variations. The above indicated composition of $Al_2(SO_4)_3$—$16H_2O$ is the label designation of a well known manufacturer of laboratory reagents. However, the American Chemical Society Specifications for this compound admit a variation in the degree of hydration between 14 and 18 molecules of $H_2O$ and on the labels of other manufacturers, the hydration content is 18 molecules of $H_2O$. Also known are other hydration values, such as 9 molecules of $H_2O$ and, of course, the water-free compound $Al_2(SO_4)_3$. In an aqueous solution system these differences become meaningless and it is desired that, where ratio quantities of salts are referred to such as the ratios between aluminum and iron salts, these shall be reduced to a ratio between $Al_2O_3$ and $Fe_2O_3$ equivalents.

Generally, it is preferred that the amount of aluminum salt in the composition is not less than 10% of that of the iron salt present. However, amounts far exceeding this proportion and far greater than the amount of iron salt present may have important advantages. The latter may pertain not only to the increase in the rate of regeneration but to other economic advantages as will be brought out below.

From the above, it is seen that by the addition of an aluminum salt, such as aluminum sulfate, a 50% increase in the rate of regeneration, i.e. from about 33 to about 50%, can be obtained.

Combined with the use of thermal acceleration in Stage II, obtained by the use of heat exchangers, etc., the use of an aluminum salt in combination with an iron salt provides an important improvement of the flue gas treatment previously disclosed.

The efficiency and economy of the process is greatly improved by requiring less frequent cycling, by decreased costs, and other advantages.

Therefore, one purpose of this invention is to provide a composition for the scrubbing of flue gases in order to remove sulfur dioxide from them, said composition containing a varying amount of sulfuric acid, a compound of iron providing ferric ions in excess of 0.6%, and an aluminum compound providing aluminum ions in an amount of not less than 0.05% by weight.

Another purpose is to provide a process for removing sulfur dioxide from flue gases by scrubbing them with a composition containing ferric ions in excess of 1% and an aluminum compound providing not less than 0.05% of aluminum ions.

Still another purpose is to provide a process for removing sulfur dioxide from flue gases by scrubbing them with a composition containing varying amounts of sulfuric acid, ferric ions in excess of 1%, not less than 0.05% of aluminum ions, said process also including a stage in which said composition is scrubbed with air to convert ferrous to ferric ions.

Still another purpose is to provide a process for removing sulfur dioxide from flue gases by scrubbing them with a composition containing an iron salt providing not less than 1% of ferric ions, such as ferric sulfate, and an aluminum salt, such as aluminum sulfate in a weight percentage exceeding that of the iron salt.

Still another purpose is the one described above, providing that the process includes a regenerating stage in which the composition is scrubbed with air to oxidize the ferrous to ferric ions, also providing that the composition is held at not lower than 70° C. to keep it liquid during scrubbing, but also providing such a content of aluminum sulfate that the composition is a solid at ambient room temperature.

In the process disclosed herein, the amount of iron compound in the composition is such that, if complete solution is obtained, the amount of iron ions will be in excess of 0.6%, preferably in excess of 1%, and still more preferably 4%, or even higher. With increasing concentration of sulfuric acid in the composition, the solubility of the iron salts, such as ferric or ferrous sulfate, decreases and the iron compound may be present as a solid phase suspended in the composition, giving the latter the nature of a suspension or slurry. An excess of ferric compound, although not in solution, may still be capable of reacting with sulfur dioxide. Therefore, no upper limit of the ferric content of the composition is conceived and a content of iron compound beyond its saturation limit in the scrubbing composition is considered to be within the scope of this invention.

The amount of aluminum compound in the composition will generally be such that a minimum of 0.05% by weight of aluminum ions will be present. However, a higher percentage is more desirable and, as a matter of accelerating the rate of regeneration in Stage II, the highest possible weight percentage will be aimed at. Just like in the case of iron compounds, the solubility of aluminum compounds, such as aluminum sulfate, decreases with increasing acid concentration. As a consequence, a certain amount of such an aluminum compound may also be present as a solid phase and may give the composition, like in the case of undissolved iron compound, the nature of a suspension or slurry, as it then contains the aluminum compound in a weight percentage above its saturation limit.

The invention conceives no upper limit in the amount of iron sulfate and aluminum sulfate present in the composition, beyond the practical necessity to maintain its fluidity adequate to act as a scrubbing medium, which also depends on the operating temperature provided. Lower limits may be set for a variety of operating reasons and for reasons depending on the ultimate destination of the scrubbing compound.

A composition in accordance with this invention may be prepared by dissolving an iron salt, for example a commercial grade of ferric sulfate, and an aluminum salt, such as a commercial grade of aluminum sulfate, in water. Sulfuric acid may, or may not, be added at this stage.

An alternate, and economically more desirable method of preparing the composition of this invention is to use, in place of commercial grades of iron and aluminum salts, iron and aluminum containing waste materials or naturally occurring mineral deposits. Examples for such iron sources would be "red mud" wastes from the Bayer process, bog ores, etc. Examples of such aluminum sources would be calcined clay, ferruginous bauxite, bauxitic clay, etc. To bring such material into solution, sulfuric acid, or a flue gas scrubbing fluid containing such acid, would be used. Also involved would be a leaching process and leaching equipment. Both such processes and equipments are well known and are no part of this invention.

The sulfuric acid content of the scrubbing composition increases progressively in proportion to the amount of sulfur dioxide converted. For some purposes, especially where sulfuric acid itself is a desired end product of the process, the increase in sulfuric acid content may be permitted to continue to the highest attainable concentration.

However, for other purposes it is desirable to set an upper limit to the acid content of the composition. As an embodiment of this invention, this is accomplished by incorporating a leaching phase into the process by integrating the scrubbing and leaching phases as described below. In such an integration, the scrubbing composition is permitted to react with some material, of the class mentioned above, while the composition is still hot, either heated by the flue gas in Stage I or after Stage II where it has been heated by heat exchangers, etc. The effectiveness of leaching is greatly increased and the expenses of additional heat input are avoided or minimized. Depending on the material to be leached, the acid concentration may vary over a wide range. Generally, it will be from 2% upwards, with about 20% of $H_2SO_4$ presenting an optimum for most leaching operations. By selecting leaching material, time, temperature, etc. a desirable percentage of acid content in the composition may be maintained. In addition, this integrated leaching phase provides a convenient method of adding materials such as iron or aluminum, and possibly other materials, to the composition.

While the predominant concept of integration of scrubbing and leaching is based on utilization of the residual heat in the scrubbing composition, this is not absolutely exclusive of introduction of additional heat either before, during, or after the leaching step. Utilization of such additional heat inputs is within the concepts of this embodiment.

Another area of benefits arising from the integration of the scrubbing and leaching steps lies in the combination of operations to eliminate undesirable solids and particulates by filtering, centrifuging, settling, etc. The particulates in the flue gases which will not dissolve in the scrubbing fluid, such as silica, silicates, carbon, soot, etc., as well as the insolubles from the leaching step, can be eliminated in one joint operation. The advantages from the point of view of heat economy, equipment investment, handling and disposal of refuse, etc., are obvious.

The above described integration of scrubbing and leaching can be applied usefully for the recovery and concentration of various materials. As an example, it can be used to extract copper from low-grade copper-containing deposits which are not economically exploitable by other means. Utilization for the recovery of other mineral values is obvious.

However, an important embodiment of the integration of scrubbing and leaching with the disclosed composition lies in the utilization, for material to be leached, of a natural mineral deposit, or equivalent material, which is high in content of acid-soluble aluminum compounds. Such a deposit may be clay (particularly after calcining) bauxitic clay, bauxite, ferruginous bauxite, latherite, alunite, dawsonite, coal waste shale, etc.

Thus, the scrubbing composition acquires a progressively increasing content of aluminum. This aluminum content is not only beneficial from the point of view of accelerating the rate of regeneration. In addition, it enhances the economic attractiveness of this process by making the scrubbing composition a raw material for the recovery of aluminum sulfate, aluminum oxide, and, ultimately, metallic aluminum. As an example for such possible utilization, the Potassium Alum Process mentioned on pages 19–23 of Reference No. 1 (see below) is referred to.

The growing economic interest in U.S. domestic mineral deposits for the production of aluminum is shown in the following references. Also shown in them are various aluminum-containing mineral deposits which would be potentially useful leaching materials in accordance with the process described herein.

1. Revised and Updated Cost Estimates for Producing Alumina from Domestic Raw Materials. Frank A. Peters and Paul W. Johnson. Information Circular 8648. Bureau of Mines 1974. U.S. Dept. of the Interior.

2. Alumina from Domestic Resources. A miniplant Project to Evaluate Alumina Recovery Processes. Bureau of Mines 1974. U.S. Dept. of the Interior.

3. Potential Sources of Aluminum. Information Circular 8335. Staff. Bureau of Mines 1967. U.S. Dept. of the Interior.

4. Bauxite Reserves and Potential Aluminum Resources of the World. Sam H. Patterson. Geological Survey Bulletin 1228. (1967) Geological Survey—U.S. Dept. of the Interior.

As a consequence, an additional purpose of this invention is to provide a process for the removal of sulfur dioxide from flue gases by means of a fluid scrubbing composition containing an iron salt and an aluminum salt, in which the alternating steps of scrubbing with flue gas and with air are integrated with a leaching operation, in which the composition, heated as a consequence of the scrubbing procedures, extracts aluminum compounds, or other useful materials, from mineral deposits, waste materials, and the like.

Thus the major economic advantages and benefits of this invention are seen in the integration of a solution to three problems of major economic impact.

A. Energy Sufficiency.

The described process removes sulfur dioxide from flue gases in a highly complete and efficient manner. It is fully regenerative and eliminates the ecologic calamity of disposing and dumping of hundreds of millions of tons per year of useless sludges resulting from the heretofore favored processes based on lime scrubbing. In an ecologically acceptable manner, the process permits the utilization of the nearly inexhaustible supply of high sulfur coals available in the U.S., thus assisting in making the U.S. independent from imported sources of energy.

B. Utilization of Sulfur.

The many millions of tons of sulfur locked up in these coals, heretofor considered an ecologic nuisance and danger, now acquire the status of a major national resource. Transferred by this process to sulfuric acid, the U.S. may easily become the largest producer of this chemical (and its derivatives) in the world, not only with ample supplies to meet its domestic needs, but also with a huge exportable surplus.

C. Utilization of domestic alumina sources.

A specific embodiment of this invention is to link the sulfuric acid obtained in the flue gas scrubbing with the extraction of alumina from the nearly inexhaustible low-grade domestic mineral sources containing alumina. The low cost and abundance of the sulfuric acid derived from this process may give new impetus to the growing interest of making the aluminum industry independent from imported alumina. This could accelerate a change in the relatively neglected status of low-grade domestic alumina minerals to that of a major economic resource.

The present invention may be embodied in other specific forms without departing from the spirit or essential attributes thereof and, accordingly, reference should be made to the appended claims, rather than to the foregoing specification as indicating the scope of the invention.

What is claimed is:

1. An aqueous scrubbing fluid for removing sulfur dioxide from flue gas by scrubbing the gas and capable of being subsequently regenerated by the oxidizing action of air, said fluid consisting essentially of ferric sulfate, aluminum sulfate, and water, said ferric sulfate providing in excess of 0.6% by weight of ferric ions, and said aluminum sulfate providing not less than 0.05% by weight of aluminum ions.

2. A scrubbing fluid in accordance with claim 1, in which the iron sulfate provides in excess of 0.6% by weight of ferric ions and the aluminum sulfate is present to the extent of not less than 10% by weight of the iron sulfate, said percentage being expressed in terms of equivalent $Al_2O_3$ and $Fe_2O_3$ derived from these compounds.

3. A scrubbing fluid in accordance with claim 1, in which the iron sulfate provides in excess of 0.6% by weight of ferric ions and the aluminum sulfate is present in a percentage greater than that of the iron sulfate, the ratio between these compounds being expressed in terms of equivalent $Al_2O_3$ and $Fe_2O_3$.

4. A scrubbing fluid in accordance with claim 1, containing iron sulfate, and aluminum sulfate, in which the aluminum sulfate content is so high that the composition is a solid at ambient room temperature, but a liquid at a temperature of above 70° C.

5. A scrubbing fluid in accordance with claim 1, containing ferrous sulfate, and aluminum sulfate, in which at least a portion of the ferrous sulfate has been oxidized by air scrubbing to produce ferric sulfate sufficient to provide in excess of 0.6% by weight of ferric ions, and in which the aluminum sulfate content is so high that the composition is a solid at ambient room temperature but a liquid at above 70° C.

6. A scrubbing fluid in accordance with claim 5, containing in aqueous solution ferrous sulfate, providing not less than about 4% by weight of $Fe_2O_3$ equivalent aluminum sulfate, and providing in excess of 6% by weight of $Al_2O_3$ equivalent in which at least a portion of the ferrous sulfate has been oxidized by air scrubbing to produce not less than 0.6% by weight of ferric ions, and in which the aluminum sulfate content is so high that the composition is a solid at ambient room temperature but a liquid at above 70° C.

* * * * *